United States Patent [19]

Ott

[11] 4,293,253

[45] Oct. 6, 1981

[54] TOOL HOLDER AND CARBIDE INSERT

[76] Inventor: Clyde E. Ott, c/o Pace Precision Tool & Die Co., Inc., Ohio Ave., DuBois, Pa. 15801

[21] Appl. No.: 48,096

[22] Filed: Jun. 13, 1979

[51] Int. Cl.³ .............................................. B23B 51/12
[52] U.S. Cl. .................................. 408/226; 279/103; 408/144; 408/713
[58] Field of Search ............... 408/713, 226, 144, 715, 408/241 R; 279/103

[56] References Cited

U.S. PATENT DOCUMENTS

| | | | |
|---|---|---|---|
| 988,355 | 4/1911 | Knight | 279/103 |
| 1,018,096 | 2/1912 | Clark | 279/103 |
| 1,052,309 | 2/1913 | Boone | 279/103 |
| 1,471,702 | 10/1923 | Mulac | 279/103 |
| 1,969,654 | 8/1934 | MacLean | 279/103 X |
| 2,087,814 | 7/1937 | Rawlings | 279/103 |
| 3,244,426 | 4/1966 | Skoglund | 279/103 X |
| 3,678,632 | 7/1972 | Eversole et al. | 408/144 X |
| 4,047,830 | 9/1977 | Kruger | 408/144 X |
| 4,160,616 | 7/1979 | Winblad | 408/144 |

FOREIGN PATENT DOCUMENTS 319308  3/1920  Fed. Rep. of Germany ...... 279/103

OTHER PUBLICATIONS

*Design of Metal Cutting Tools,* p. 165, Author–Woodcock, Publ. McGraw-Hill, 1948.
*Metal Cutting Tool Handbook,* pp. 156 & 157, Publ. Metal Cutting Tool Institute, 1965.
*Handbook of Small Tools,* pp. 258 & 259, Author–Oberg, Pub. 1908.

*Primary Examiner*—William R. Briggs
*Attorney, Agent, or Firm*—Frank B. Robb

[57] ABSTRACT

There is a disclosed tool holder and bit construction for use in precision machining operations, wherein the tool holder is provided with means to removably position the same for rotation by a machine spindle, and a cavity of precise rectangular uniformly diminishing cross-section inwardly from one end, to receive a mating correspondingly precisely formed tool bit comprised solely of a carbide composition and integral shank to be positioned in and removable from the cavity when conditions require, means being provided in said holder to facilitate such removal.

3 Claims, 5 Drawing Figures

TOOL HOLDER AND CARBIDE INSERT

BACKGROUND OF THE INVENTION AND PRIOR ART

This invention is directed to the art of tool holders and bits used therein, such tool holders primarily being intended for use in rotational machining operation, where high precision is demanded and produced by reason of the ability of the equipment to react to precision setting and to be readily observed and any wearing of the tools therein immediately terminated by replacement of the tools for continued operation to produce desired precise results.

Particularly the concept herein is directed to a tool holder which is arranged for positioning on a spindle of a machine or the like for rotation, and in which a tool bit is insertable and removable therefrom, the cavity in which the bit is positioned being of novel configuration, and the concept of using a tool which is what may be termed replaceable or a throw-away tool is particularly suitable, the tool in this instance having a carbide composition which enables the production of large quantities of precise parts before replacement of the tool is required and yet enables carbide composition tool bits to be used without the necessity to cement or otherwise affix them to tool bit base members.

With the foregoing in mind therefore, the prior art consideration indicates that probably the most nearly related tool holder and bit construction is that shown in the Knight U.S. Pat. No. 935,035, which discloses a taper adaptor, as having positioned therein a drill or the like with a shank of rectangular configuration but only imprecisely arranged so that it is in fact only intended for drilling miscellaneous and particularly soft material with the bit to be removed but the tapering arrangement thereof conforming only to known Morse taper as was existent at the time of the invention hereof in the patent application eventuating in the patent of Knight.

There was in fact at the time of Knight no requirement for the precision machinery available presently and thus not requiring any precise machine equipment in the form of drills and drill holders or the like.

There are other known forms of drill mounting means, in the prior art but none shows any such arrangement as the applicant and nothing any more related than the disclosure of Knight heretofore set forth.

DESCRIPTION OF THE INVENTION

With the foregoing background in mind the invention hereof is more precisely described as comprising a tool holder and bit construction which is used in precision machining operations, the tool holder being provided with means to removably position the same, that is the tool holder, for rotation by a machine spindle, the tool holder having a cavity of precise rectangular uniformly diminishing cross-section formed therewithin, and extending inwardly from one end of the tool holder to receive a mating correspondingly precisely formed tool bit comprised solely of a carbide composition and integral shank to be positioned in and removable from the cavity when conditions require, such as is occasioned by the determination that wear will take place after a given number of pieces are provided or if measurement determines that the bit shall be removed and replaced, the bit being in this instance intended to be thrown away if possible but if necessary reworked by sharpening, requiring however that use in a like circumstances at the same time require resetting of the machine something which is desired to be overcome in volume production.

It is the concept that the tool bits hereof shall be formed in such a precise manner that they may be removed or more clearly replaced in or removed from the tool holder very rapidly to prevent loss of time or production, and thereby not requiring any resetting of the machine, for a given number of tool bit replacements in any event.

If the carbide is to be recovered, or more clearly the carbide composition tool bit is to be recovered it may be done in whatever manner the industry sees fit or if certain sharpening can be resorted to for limited periods the bit can be replaced as long as resetting of the machine is feasible.

The foregoing adequately outlines the objectives hereof, and in large measure describes the broad outlines of the invention specific disclosure and description herein following, and particularly referred to by reference to the drawing wherein.

DETAILED DESCRIPTION OF THE INVENTION

Figure 1:
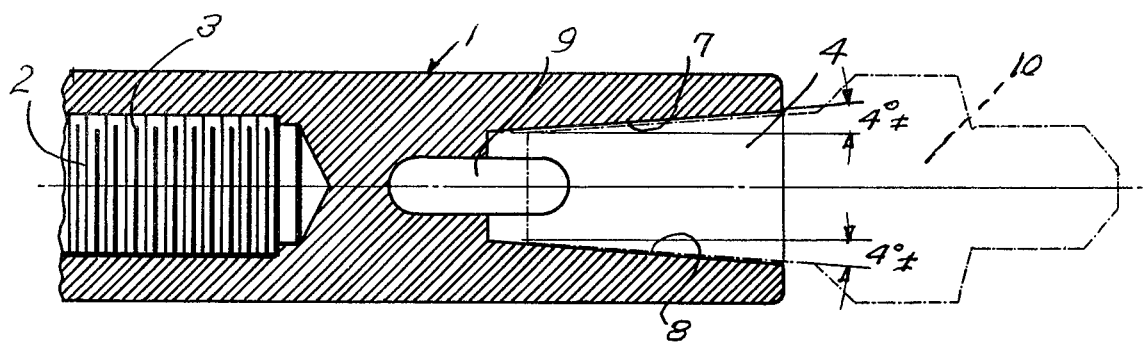
FIG. 1 is a cross-sectional view of a tool holder with the bit shown in place therein in phantom, the tool holder being fragmentary in some respects to foreshorten the same yet showing the relationship of the respective parts.

Referring now to FIG. 1, the tool holder hereof, is shown as comprising a body generally designated 1, at one end of which is the cylindrical opening 2, which in this instance is threaded as suggested at 3 and of sufficient length to enable the mounting of the tool holder as a whole on a machine which includes specifically the spindle thereof for rotation of the tool holder.

Figure 5:
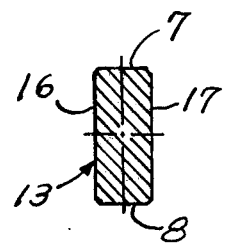
FIG. 5 is a cross-sectional view taken about on the line 5—5 of FIG. 3 looking in the direction of the arrows to indicate the rectangular formation.
Figure 4:
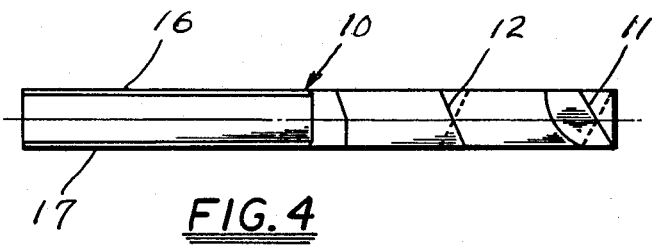
FIG. 4 is a view at 90 degrees to FIG. 3 and in side elevation.

At the opposite end of the holder body 1, is a cavity 4 of peculiar and precise formation, in this instance being rectilinear in cross-section as suggested in FIG. 5, the cavity diminishing in dimension from the end 5 of the tool holder to the interior of the cavity and the bottom being denoted 6.

It will be observed that the tool holder cavity 4, is provided with the inwardly tapering walls 7 and 8, which are uniformly tapered and as such on each being tapered 4 degrees plus or minus 1 minute, a highly precise formation being necessary and absolutely essential in the concept herein.

The cavity is transversely related to a tool removing opening designated 9, which will be useful in a manner to be subsequently described.

Figure 3:
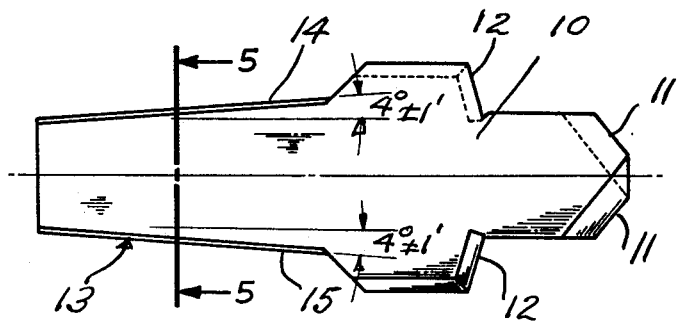
FIG. 3 is a plan view of one of the tools on a very much enlarged scale to ilustrate the taper formation of the shank thereof.

Referring now to FIG. 3, the tool bit itself is shown and generally designated 10, including the cutting edges 11 and 12 which are duplicated at opposite sides of the tool bit, so that upon rotation the cutting operation for which they are formed will be effected.

The tool bit itself is flat as will be noted, and is provided with a shank 13, which is in turn formed with tapering faces 14 and 15 to mate with the cavity faces 7 and 8 previously referred to.

The taper of this tool bit, is a similarly precisely arranged taper of 4 degrees plus or minus 1 minute, so that the surfaces 14 and 15 will in all cases coact with and be maintained in contact with the corresponding faces of the cavity 7 and 8.

It will be understood that the other faces of the shank and likewise of the tool bit as a whole in this case denoted 16 and 17 are flat faces and parallel with one another, to mate with the similarly formed parallel walls 19 and 20 of the cavity 4 initially referred to.

Figure 2:
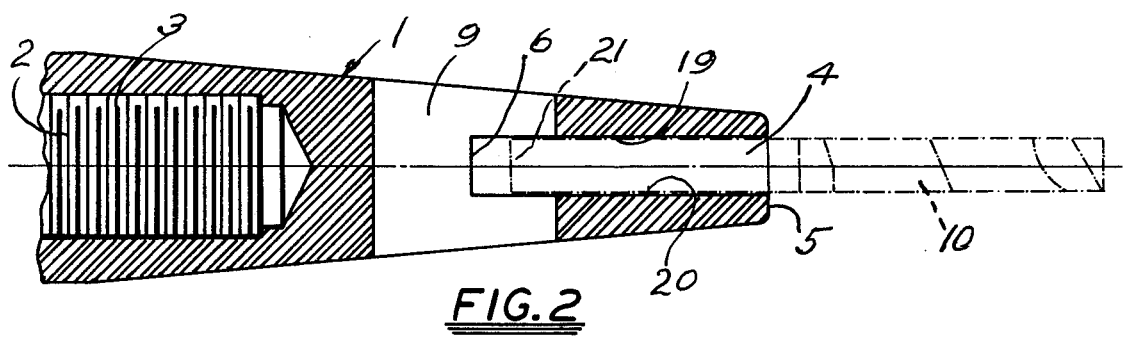
FIG. 2 is a view of the tool holder at 90 degrees in cross-section to the disclosure of FIG. 1.

It will be understood that the shank 13 of the tool bit just described, will terminate inwardly in the cavity at about the point suggested by the dotted line 21 in FIG. 2, this representing the position of the tool bit in dotted lines in its relationship and position.

It should be emphasized that the tool bits in this instance are formed entirely of a carbide composition, and if possible intended to be thrown away after use for a period of time predetermined to provide the necessary accuracy in production of parts machined thereby.

It will be apparent that this machining operation is designed to be accomplished at high speed and that the machine upon which the tool holder 1 is mounted, will be of such a nature as to rotate the tool holder at high speeds, and obviously be adjustable but during the course of production of parts, when occasion demands the machine can be momentarily stopped, the tool bit 13 quickly removed by insertion of an appropriate tool in the opening 9, whereby the tool bit is ejected from the cavity 4, a like tool immediately replaced in the cavity in the position shown, and the machine thereupon commenced operating again with miminum delay which would be required if the tool bit had to be sharpened and replaced in the ordinary manner of machines heretofore known.

The formation of the taper in this instance has been found to be very precisely required to conform to that disclosed and described, and is distinguished from the Morse taper by reason thereof since it has been found that the necessary gripping action of frictional engagement provided by the 8 degree included angle is such as to produce the best results.

It also resists the vibratory forces which might tend to loosen the same and yet likewise permits removal of the tool bit when necessary.

It is not considered essential as to the shape or form of the cutting edges of the tool these being illustrative only and not limiting.

It should perhaps be explained and noted that the disclosure herein is on a very much enlarged scale in all instances, since the tool bit itself dimensionally, is shown on 4 times scale and this is also the case with the tool holder body 1.

I claim:

1. A tool holder and bit construction comprising a rotatable holder body, means to connect said body to rotating mechanism at one end, a tool shank receiving cavity at the other end, said cavity being of flattened rectangular cross-section, diminishing uniformly in area from its widest dimension at the entrance, to the inner end on a total taper of 8 degrees with minimum tolerance therefrom, the tool bit being a preformed carbide composition member having a shank with corresponding cross-section and taper tolerance substantially identical to that of the cavity, shank being frictionally positioned in the cavity, and means to effect removal of said shank from the cavity.

2. A tool holder and bit construction as claimed in claim 1, wherein the narrowest side walls of the cavity each tapers inwardly uniformly at an angle of four degrees with respect to the center line of the cavity.

3. A tool holder and bit construction as claimed in claim 2, wherein the widest walls of the cavity are parallel and corresponding faces of the tool bit shank conform thereto.

* * * * *